(12) United States Patent
Im et al.

(10) Patent No.: US 9,672,084 B2
(45) Date of Patent: Jun. 6, 2017

(54) METHOD OF GENERATING AUTOMATIC CODE FOR REMOTE PROCEDURE CALL

(71) Applicant: SAMSUNG ELECTRONICS CO., LTD., Suwon (KR)

(72) Inventors: Chae-seok Im, Yongin-si (KR); Shin-gyu Kim, Seoul (KR); Min-wook Ahn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/753,844

(22) Filed: Jun. 29, 2015

(65) Prior Publication Data

US 2016/0004579 A1    Jan. 7, 2016

(30) Foreign Application Priority Data

Jul. 1, 2014 (KR) ........................ 10-2014-0081990

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/54 | (2006.01) | |
| G06F 9/45 | (2006.01) | |

(52) U.S. Cl.
CPC ............... *G06F 9/547* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 7,559,051 B2 | 7/2009 | De Oliveira Kastrup Pereira et al. | |
| 7,669,209 B2 | 2/2010 | Inohara et al. | |
| 8,656,120 B2 | 2/2014 | Lee et al. | |
| 8,713,089 B2 | 4/2014 | Murphy et al. | |
| 8,752,006 B1* | 6/2014 | Tolle ......................... | G06F 8/30 717/106 |
| 2003/0177319 A1* | 9/2003 | de Jong ............... | G06Q 20/341 711/154 |
| 2004/0143720 A1* | 7/2004 | Mansell .............. | G06F 12/1491 711/206 |
| 2006/0112237 A1* | 5/2006 | Chen ................... | G06F 12/0837 711/144 |
| 2007/0271418 A1* | 11/2007 | Sridharan ........... | G06F 11/0748 711/146 |
| 2013/0067201 A1* | 3/2013 | Takeuchi .......... | G06F 15/17337 712/216 |
| 2014/0052771 A1 | 2/2014 | Anantharam et al. | |

* cited by examiner

*Primary Examiner* — Tuan Dao
*Assistant Examiner* — William C Wood
(74) *Attorney, Agent, or Firm* — Staas & Halsey LLP

(57) ABSTRACT

A method of generating a code for a remote procedure call (RPC) includes obtaining a source code including information indicating a part where the RPC is to be performed, and generating a code for calling the RPC and a code for executing an RPC procedure, by analyzing the source code including information indicating the part where the RPC is to be performed.

9 Claims, 17 Drawing Sheets

LOCAL CALL

REMOTE CALL

FIG. 11

```
…
struct arg_run_fd {
    struct img in_img;
    struct face_engine *fe;
    int global;
}
program PROG {
    version VER {
        run_fd(arg_run_fd) = 1;
    } = 1;
} = 1;
```
interface.x

```
int *run_fd_1_svc(arg_run_fd *argp)
{
    int global;
    global = argp->global;
    run_fd(argp->in_img, argp->fe);
}
```
interface_server.c (DSP)

```
run_fd()
{
    process_fd(global);
}
```
fd.c (DSP)

```
int global = INIT_VALUE;
int main ()
{
    while () {
        arg_run_fd arg;
        memcpy(&arg.in_img, in_img, sizeof(img));
        arg.fe = fe;
        arg.global = global;
        arg.fe -= mmap_offset;
        arg.in_img.data -= mmap_offset;
        arg.fe.roi -= mmap_offset;
        run_fd_1(&arg);
        arg.fe.face_roi += mmap_offset;
    }
}
```
main.c (CPU)

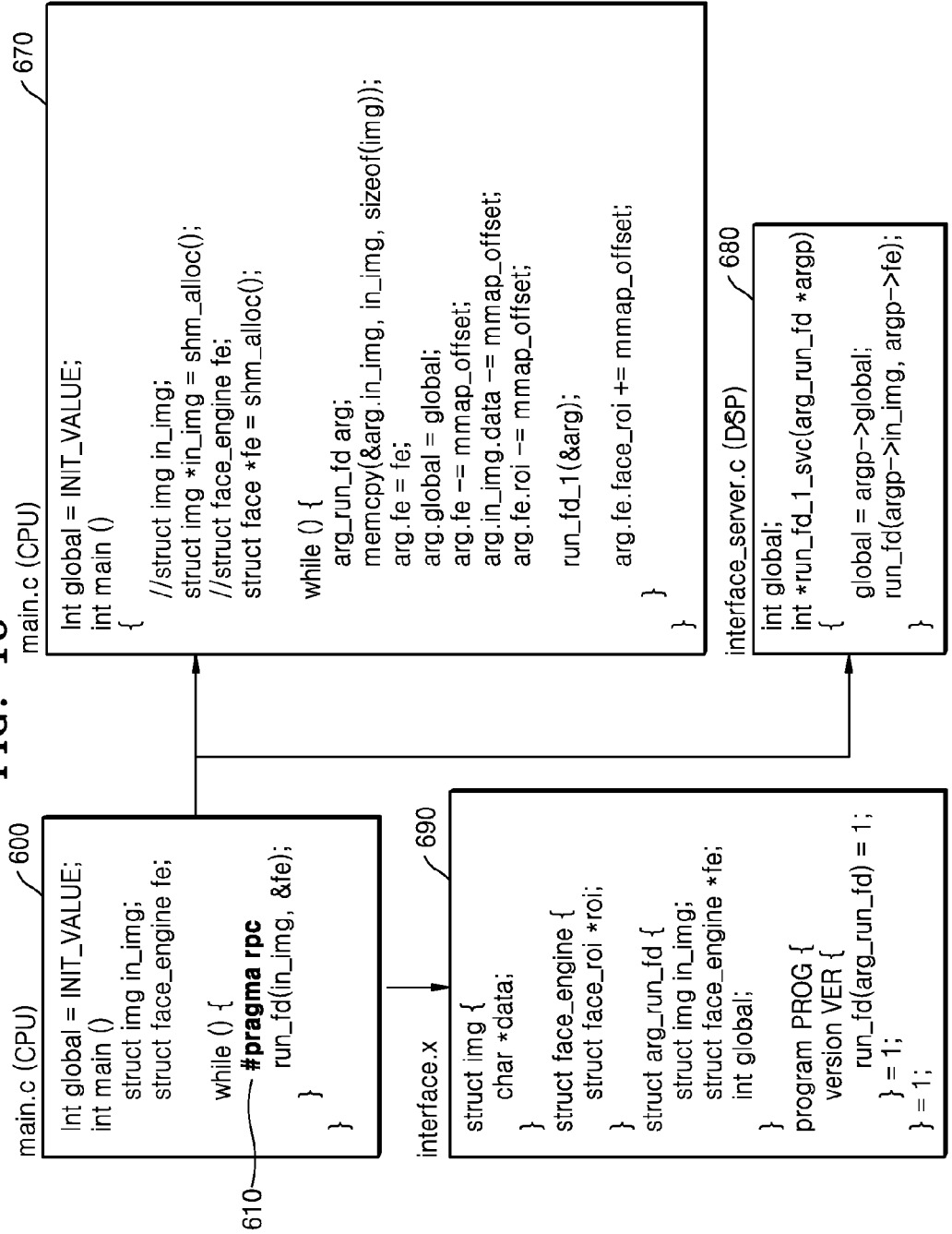

METHOD OF GENERATING AUTOMATIC CODE FOR REMOTE PROCEDURE CALL

CROSS-REFERENCE TO RELATED APPLICATION

This application claims the benefit of Korean Patent Application No. 10-2014-0081990, filed on Jul. 1, 2014, in the Korean Intellectual Property Office, the disclosure of which is incorporated herein in its entirety by reference.

BACKGROUND

1. Field

One or more exemplary embodiments relate to a programming model which may be applied to compiler processing, and more particularly, to a programming model which may be applied to a method of automatically generating a code for a remote procedure call.

2. Description of the Related Art

A remote procedure call (hereinafter, referred to as "RPC") is a technique used by a main processor to call a procedure of a sub-processor via a procedure call interface in the main processor.

FIG. 1 schematically illustrates a local call and a remote call as examples of a procedure call method.

As illustrated in FIG. 1A, for a local call, a processor p of a site A calls a procedure P. The calling and execution of the procedure P are performed at the same site A.

As illustrated in FIG. 1B, for a remote call, as shown in FIG. 1A, the processor p of the side A calls the same procedure P and actual execution occurs at another remote site B. The meaning and effect of the procedure call are the same as in the case in FIG. 1A. In other words, in the cases of FIG. 1A and FIG. 1B, input information for the procedure call is the same and outputs in response to the execution of the procedure may have the same result. The site A and the site B may respectively correspond to a main processor and a sub-processor. For example, a relationship between the main processor and the sub-processor may a relationship between a client and a server. Alternatively, it may be a relationship between a central processing unit (CPU) and a digital signal processor (DSP). The procedure call and response are made between the main processor and the sub-processor through communication with each other.

SUMMARY

One or more exemplary embodiments provide a method of automatically generating a code for a remote procedure call.

One or more exemplary embodiments provide a data processing apparatus including a compiler for automatically generating a code for a remote procedure call.

Additional aspects will be set forth in part in the description which follows and, in part, will be apparent from the description, or may be learned by practice of the presented exemplary embodiments.

According to one or more exemplary embodiments, a method of generating a code for a remote procedure call (RPC) includes obtaining a source code including information indicating a part where the RPC is to be performed, and generating a code for calling the RPC and a code for executing an RPC procedure, by analyzing the source code including information indicating the part where the RPC is to be performed.

The information indicating the part where the RPC is to be performed may be an annotation.

The generating of the codes may include generating an interface description needed for an RPC stub code.

The code for calling the RPC may be a main processor source code, and the code for executing the RPC procedure may be a sub-processor source code.

The generating of the codes may include processing the RPC, and the processing of the RPC may include generating a procedure code performed by the sub-processor, generating a code for assigning shared data between the main processor and the sub-processor to a shared memory, and generating a procedure parameter transferring code for the RPC.

The generating of the codes may include processing a global variable, and the processing of the global variable may include performing data flow analysis to seek, from a procedure for performing the RPC, a part using a global variable outside the procedure, declaring and defining a global variable outside the procedure that is sought in the sub-processor source code, and inserting a sharing and copying code with respect to the global variable in the main processor source code and the sub-processor source code.

The generating of the codes may include determining if a memory management unit (MMU) exists, and if it is determined that the MMU exists, converting a virtual-physical address to perform conversion between a virtual address and a physical address, and the converting of the virtual-physical address may include analyzing a data type of a variable of a procedure for performing the RPC, selecting a variable to be address-converted, according to a result of the analyzing of the data type of the variable, and inserting a virtual-physical address converting code in the selected variable to be address-converted, before and after the RPC call.

According to one or more exemplary embodiments, a data processing apparatus includes a storage unit configured to store a source code including information indicating a part where a remote procedure call (RPC) is to be performed, and a compiler configured to generate a code for calling the RPC and a code for executing the RPC procedure, by analyzing the source code including information indicating the part where the RPC is to be performed.

The information indicating the part where the RPC is to be performed may be an annotation.

The compiler may be further configured to generate an interface description needed for generating an RPC stub code.

The code for calling the RPC may be a main processor source code, and the code for executing the RPC procedure may be a sub-processor source code.

The compiler may be further configured to generate a procedure code performed by the sub-processor, generate a code for assigning shared data between the main processor and the sub-processor to a shared memory, and generate a procedure parameter transferring code for the RPC.

The compiler may be further configured to seek, from a procedure for performing the RPC, a part using a global variable outside the procedure, through data flow analysis, declare and defines a global variable outside the procedure that is sought in the sub-processor source code, and insert a sharing and copying code with respect to the global variable in the main processor source code and the sub-processor source code.

The data processing apparatus may further include a memory management unit (MMU), wherein the compiler is further configured to analyze a data type of a variable of a procedure for performing the RPC, select a variable to be address-converted, according to a result of the analyzing of the data type of the variable, and insert a virtual-physical address converting code in the selected variable to be address-converted, before and after the RPC call.

According to one or more exemplary embodiments, a non-transitory computer readable storage medium having stored thereon a program, which when executed by a computer, performs any of the above methods.

BRIEF DESCRIPTION OF THE DRAWINGS

These and/or other aspects will become apparent and more readily appreciated from the following description of the exemplary embodiments, taken in conjunction with the accompanying drawings in which:

FIG. 11 illustrates an exemplary embodiment of the processing of a global variable;

FIG. 16 schematically illustrates a code for implementing face detection by using the code annotation type RPC of FIG. 6, according to an exemplary embodiment.

DETAILED DESCRIPTION

Figure 1A:
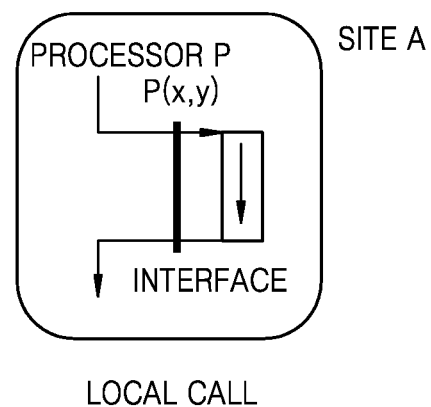
FIGS. 1A and 1B schematically illustrate a local call and a remote call as examples of a procedure calling method.
Figure 1B:
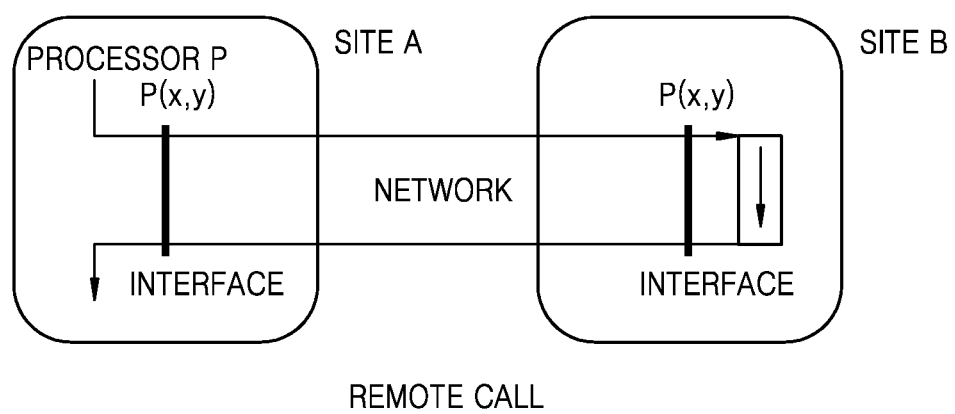

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

The terms used in the present specification are briefly described and the present invention is described in detail.

The terms used in the present invention have been selected from currently widely used general terms in consideration of the functions in the present invention. However, the terms may vary according to the intention of one of ordinary skill in the art, case precedents, and the advent of new technologies. Also, for special cases, meanings of the terms selected by the applicant are described in detail in the description section. Accordingly, the terms used in the present invention are defined based on their meanings in relation to the contents discussed throughout the specification, not by their simple meanings.

When a part may "include" a certain constituent element, unless specified otherwise, it may not be construed to exclude another constituent element but may be construed to further include other constituent elements. Terms such as "~portion", "~unit", "~module", and "~block" stated in the specification may signify a unit to process at least one function or operation and the unit may be embodied by hardware such as a field-programmable gate array (FPGA) or an application-specific integrated circuit (ASIC), software, or a combination of hardware and software. However, the unit may be configured to be located in a storage medium to be addressed or configured to be able to operate one or more processors. Accordingly, the unit as an example includes constituent elements such as software constituent elements, object-oriented software constituent elements, class constituent elements, and task constituent elements, processes, functions, attributes, procedures, sub-routines, segments of program codes, drivers, firmware, microcodes, circuits, data, databases, data structures, tables, arrays, and variables. The constituent elements and functions provided by the "units" may be combined into a smaller number of constituent elements and units or may be further divided into additional constituent elements and units. Accordingly, the present invention is not limited by a specific combination of hardware and software.

Figure 2:
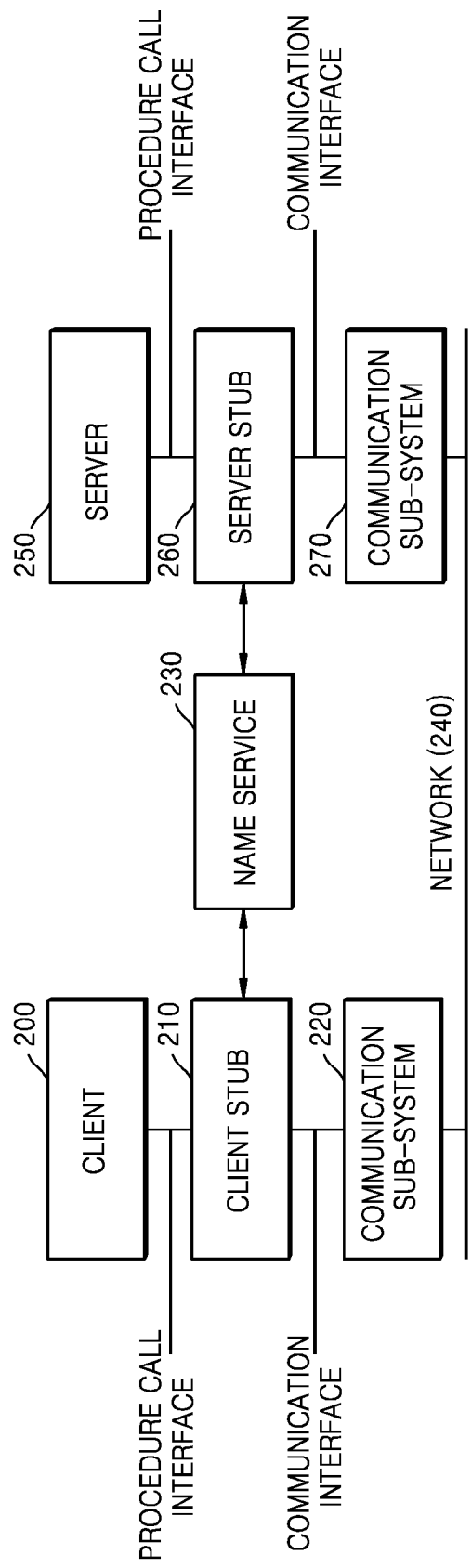
FIG. 2 is a block diagram schematically illustrating a system for implementing a remote procedure call (RPC) by using a stub, according to an exemplary embodiment.

FIG. 2 is a block diagram schematically illustrating a system for implementing a remote procedure call (RPC) by using a stub, according to an exemplary embodiment.

In FIG. 2, for example, a client 200 is used as a main processor and, for example, a server 250 is used as a sub-processor. For an RPC operation, a client stub 210 at a side of the client 200 and a server stub 260 at a side of the server 250 are provided. Both stubs 210 and 260 have an identical procedure call interface and exchange messages on a network 240 through communication sub-systems 220 and 270. A name service 230 provides information about the name of a user or computer in a network. In an example of FIG. 2, a database about the client 200 and the server 250 is prepared on the name service 230 and responds to inquiries from the client stub 210 or the server stub 260.

Figure 3:
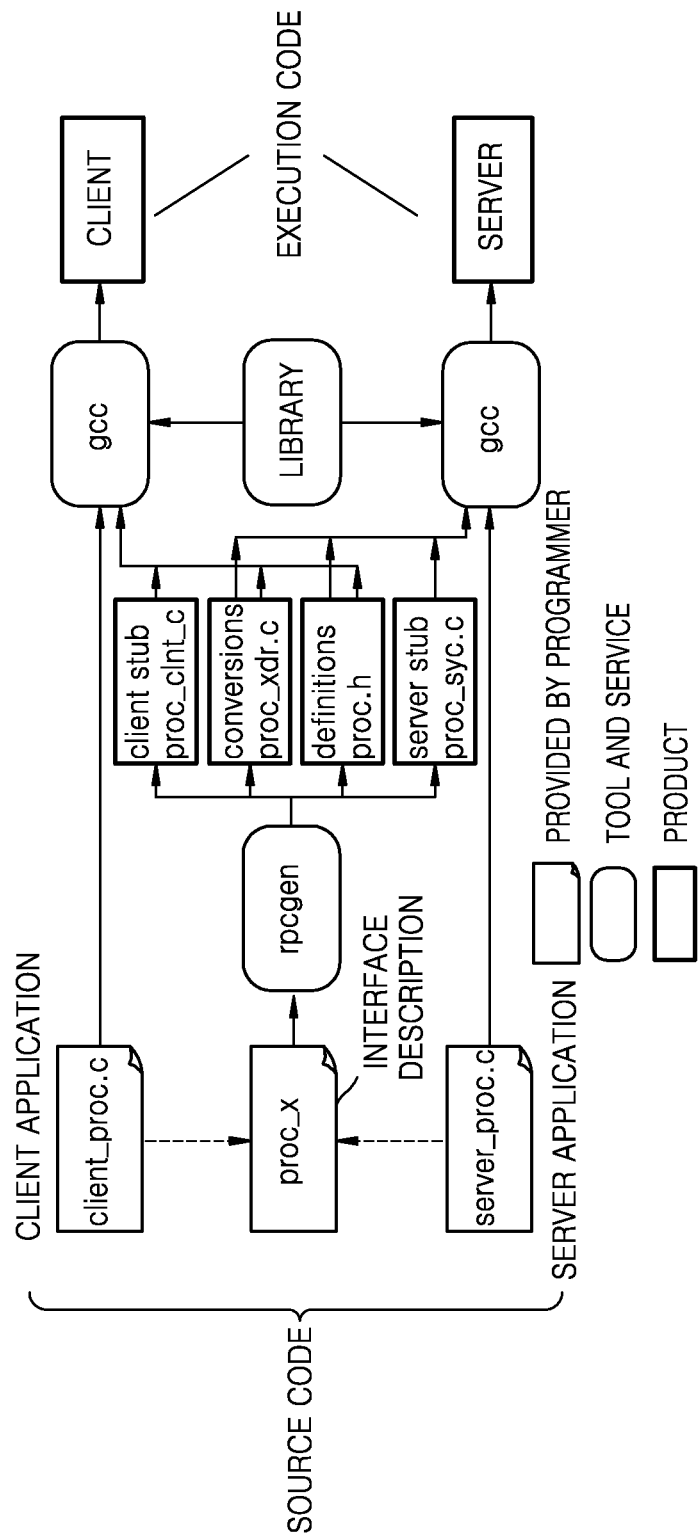
FIG. 3 schematically illustrates interface description and generation of a stub code, according to an exemplary embodiment.

FIG. 3 schematically illustrates interface description and generation of a stub code, according to an exemplary embodiment.

Referring to FIG. 3, in order to use an RPC, a programmer performs the following works. In detail, the programmer performs works including interface description, stub generation, writing a call code at a main processor, writing a procedure code at a sub-processor, and main processor and sub-processor code compiling. In FIG. 3, for example, a client is used as a main processor and, for example, a server is used as a sub-processor.

Interface description: both stubs a procedure interface is described by using an interface description language (IDL) for automatic generation of both stubs. The interface description contains all pieces of information about a procedure call interface including a data type, a transfer method, and a return data type of an input parameter, and additional information about a version and an operation method. In FIG. 3, for example, an interface description having a name of "proc.x" is written.

Stub generation: with an input of an interface description, both stub codes of the main processor and the sub-processor are generated by using an IDL compiler (rpcgen). An rpcgen compiler automatically generates stub codes of the RPC client and the server. The stub code of the RPC uses an eXternal Data Representation (XDR) method to create an open environment when materials are exchanged between application software and a different type computer. In the RPC, before data is used by a different type computer or application software, data is converted into an XDR format in its own computer and, for use in a different computer, the data converted into the XDR format may be used after being converted into a data description format used in the computer system. However, it is inconvenient for a user to directly write a stub code using the XDR in consideration of encoding/decoding, conversion of various input values, etc. to be suitable for communication specifications. By using the rpcgen compiler, the user may merely write only an RPC call code of the client and an RPC procedure code of the server to generate a program or an execution code of the client and the server. Also, the rpcgen compiler may generate XDR procedures for converting all data formats defined by the user to transmit data between the client and the server to the XDR format. In FIG. 3, for example, with an input of the interface description "proc.x", a client stub code (client stub: "proc_cInt.c"), a server stub code (server stub: "proc_svc.c"), a conversion code (conversions: "proc_xdr.c"), and a definition code (definitions: "proc.h") are automatically generated by using the rpcgen.

Writing a call code at a main processor: a code to call by transferring a parameter to a generated procedure and receive a return of a result of the call is written. In FIG. 3, for example, the main processor may become a client, and the programmer writes "client_proc.c" as a source code of a client application.

Writing a procedure code at a sub-processor: a code for performing an actual procedure by using the procedure parameter transferred through the RPC and return a result thereof to the RPC is written. In FIG. 3, for example, the sub-processor may become a server, and the programmer writes ""server_proc.c" as a source code of a server application.

Main processor and sub-processor code compiling: a carry binary is generated by compiling a source code with respect to the client and the server. In FIG. 3, for example, at the client, codes including the source code "client_proc.c" written by the programmer and the client stub code generated by the rpcgen are compiled. At the server, codes including the source code "server_proc.c" written by the programmer and the server stub code generated by the rpcgen are compiled. A GNU Compiler Collection (gcc) compiler may be used as the compiler. A library such as a sub-routine, a procedure, etc. provided by an operating system or a software development environment provider may be used for compiling. As a result of compiling, a carry binary, that is, an execution code, at each of the client side and the server side is generated.

In the exemplary embodiment using the rpcgen of FIG. 3, the source code for the client application and the server application is written in consideration of calling and executing an RPC.

Figure 4:
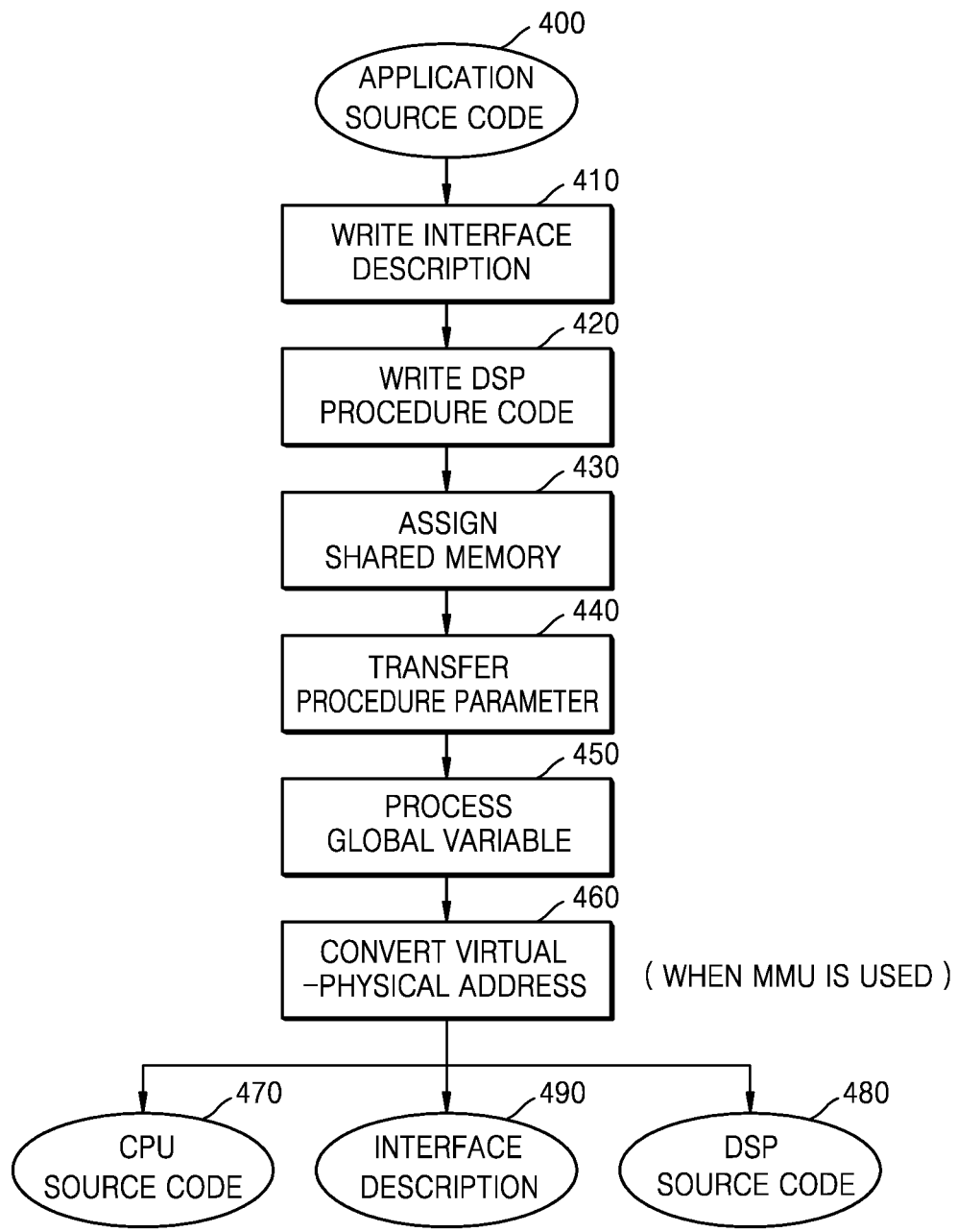
FIG. 4 is a flowchart for explaining a procedure call type RPC code generation method according to an exemplary embodiment.

FIG. 4 is a flowchart for explaining a procedure call type RPC code generation method according to an exemplary embodiment. In FIG. 4, elements to be considered by the programmer in using a procedure call type RPC are illustrated.

FIG. 4 illustrates that a procedure call type RPC is used in an exemplary embodiment in which, for example, a central processing unit (CPU) is used as the main processor and, for example, a digital signal processor (DSP) is used as the sub-processor. The programmer writes an application source code 400 to be divided into a CPU source code 470 and a DSP source code 480, as a result of applying an RPC to the application source code 400, and writes an interface description 490 between the CPU and the DSP. In other words, for the procedure call type RPC, the programmer directly writes a procedure interface description 490 and source codes 470 and 480 for calling and executing an RPC. For a correct operation of a program, an operation in which the programmer writes a code with care includes operations of writing an interface description (410), writing a DSP procedure code (420), assigning shared memory (430), transferring a procedure parameter (440), processing a global variable (450), converting a virtual-physical address (460), etc. In the above operations, directly writing a code may place a heavy load on the programmer, which may increase a development time and possibility of being an error in an RPC writing process.

In some exemplary embodiments, a code annotation type RPC is suggested. In some exemplary embodiments, when the programmer leaves a mark on a part where the RPC is to be performed without correcting an operation of an application source code, a compiler analyzes the mark and automatically generates an interface description and a source code. Also, in some exemplary embodiments, operations to be performed by the programmer may be greatly reduced, the development time may be reduced, and the possibility of being an error may be removed.

Figure 5:
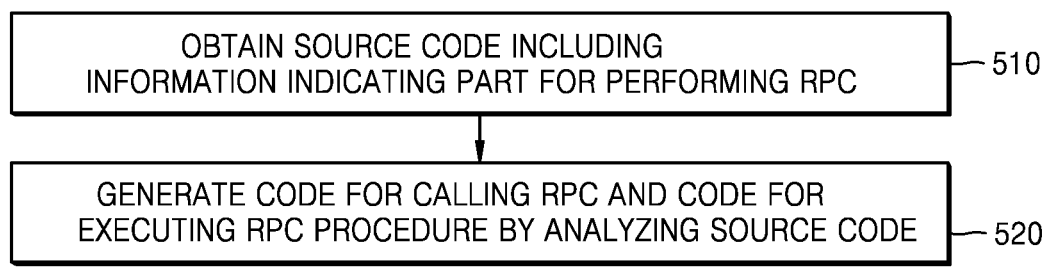
FIG. 5 is a flowchart for explaining an RPC code generation method according to an exemplary embodiment.

FIG. 5 is a flowchart for explaining an RPC code generation method according to an exemplary embodiment.

In Operation 510, a source code including information indicating a part where an RPC is to be performed is obtained.

In Operation 520, the source code obtained in the operation 510 is analyzed and a code for calling an RPC and a code for executing the RPC procedure are generated.

Figure 6:
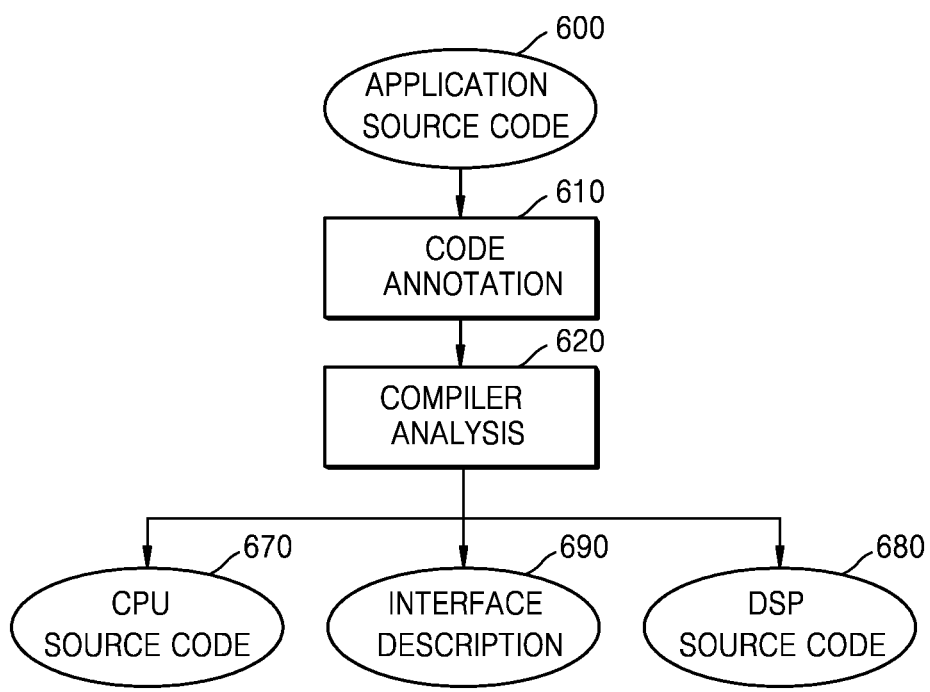
FIG. 6 is a flowchart for explaining a code annotation type RPC generation method according to an exemplary embodiment.

FIG. 6 is a flowchart for explaining a code annotation type RPC generation method according to an exemplary embodiment.

In the following description, an exemplary embodiment is described below with reference to FIG. 6, in which, by performing code annotation (610) at a position where the RPC is to be performed in an application source code 600, the writing of an interface description (410), the writing of a DSP procedure code (420), the assigning of a shared memory (430), the transferring of a procedure parameter (440), the processing of a global variable (450), and the converting of a virtual-physical address (460), which are described with reference to FIG. 4, may be automatically performed through compiler analysis (620), and a CPU source code 670, a DSP source code 680, and an interface description 690 may be automatically written.

Automatic code generation for an RPC according to an exemplary embodiment is as follows.

In Operation 610, an annotation mark is obtained from a position where an RPC is to be performed in the application source code 600.

In Operation 620, the CPU source code 670 and the DSP source code 680, which are needed for performing the RPC, are automatically generated as a compiler analyzes the annotated code. The compiler may automatically generate the interface description 690.

As illustrated in FIG. 6, the annotation type RPC code generation method may include the code annotation (610) and the compiler analysis (620).

Code Annotation

In the code annotation (610), a mark that is interpreted by the compiler is obtained from a part of the application source code 600 where the RPC is to be performed. Any annotation method may be adopted only if the method may provide additional information to the application source code 600.

Figure 7:
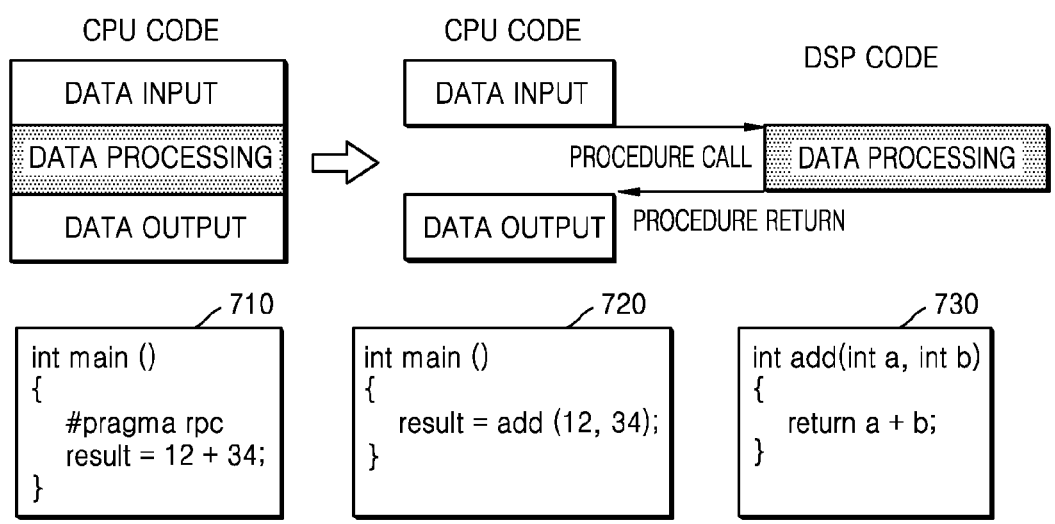
FIG. 7 is a block diagram illustrating an exemplary embodiment to explain a code annotation type RPC.

FIG. 7 is a block diagram illustrating an exemplary embodiment to explain the code annotation type RPC. In FIG. 7, "#pragma" that is a C preprocessor grammar is used. An annotation "#pragma rpc" is obtained from a part of an initial CPU code 710 where the RPC is to be performed, that is, a single statement or a code block grouped in parenthesis. Then, a corrected CPU code 720 and a corrected DSP code 730, from the initial CPU code 710 are generated through the compiler analysis (620). The corrected CPU code 720 includes a part for calling the RPC and the corrected DSP code 730 includes a part for executing a corresponding procedure. For example, when the RPC is performed on a statement "result=12+34;", the CPU code 720 generates a code "result=add(12,34)" that calls a procedure "add" in which "12" and "34" are used as data inputs and "result" is used as an data output. In this connection, a code "int add(int a, int b) {return a+b;}" that performs the procedure "add" for returning "a+b" by using inputs "int a" and "int b" is generated as the DSP code 730.

As described above, the compiler analyzes the CPU code of a part where an annotation is marked and, for example, input and output parts are generated in the CPU code and a procedure processing part is generated by being separated as the DSP code. Accordingly, an RPC code may be automatically written.

An existing IDL compiler, for example, rpcgen, may be used as a stub code for an RPC by generating an interface description, or the compiler according to an exemplary embodiment may directly generate a stub code.

Compiler Analysis

In the compiler analysis (620), CPU and DSP codes for performing an RPC are generated from the annotated CPU code through the compiler analysis. In this state, a code part that is directly written by the programmer directly write in FIG. 4 is automatically generated through the compiler analysis. A target of the compiler analysis corresponds to all codes that are written by the programmer in consideration of correct RPC execution.

Figure 8:
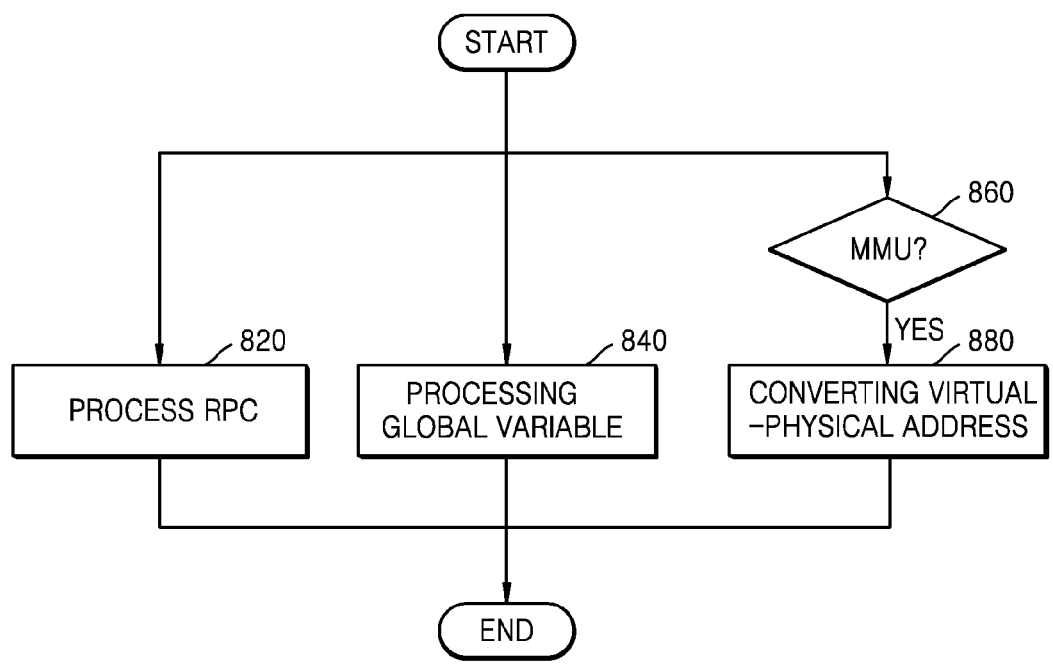
FIG. 8 is a flowchart for schematically explaining a code generation method through compiler analysis according to an exemplary embodiment.

FIG. 8 is a flowchart for schematically explaining a code generation method through compiler analysis according to an exemplary embodiment. In the compiler analysis, processing an RPC (820), processing a global variable (840), and converting a virtual-physical address (880) when there is a memory management unit (MMU) 860, are performed.

Figure 9:
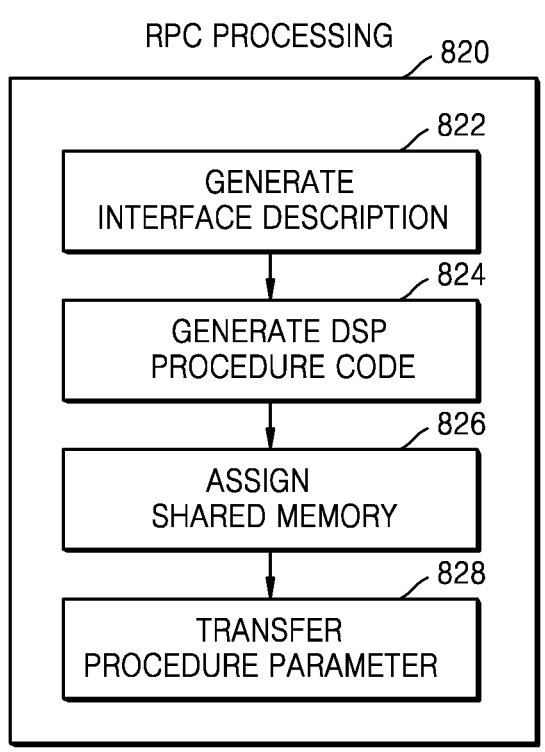
FIG. 9 is a flowchart for explaining the processing of an RPC according to an exemplary embodiment.

FIG. 9 is a flowchart for explaining the processing of an RPC according to an exemplary embodiment.

Processing of an RPC (820)

In Operation 822, an interface description for generation of an RPC stub is generated. When an interface description is already prepared or received from other element, for example, a storage unit such as an auxiliary memory device, or a network communication unit, the interface description may not be generated.

In Operation 824, a DSP procedure code is generated.

In Operation 826, a code for assigning shared data between a CPU and a DSP to a shared memory is generated.

In Operation 828, a procedure parameter transferring code for calling an RPC is generated.

Figure 10:
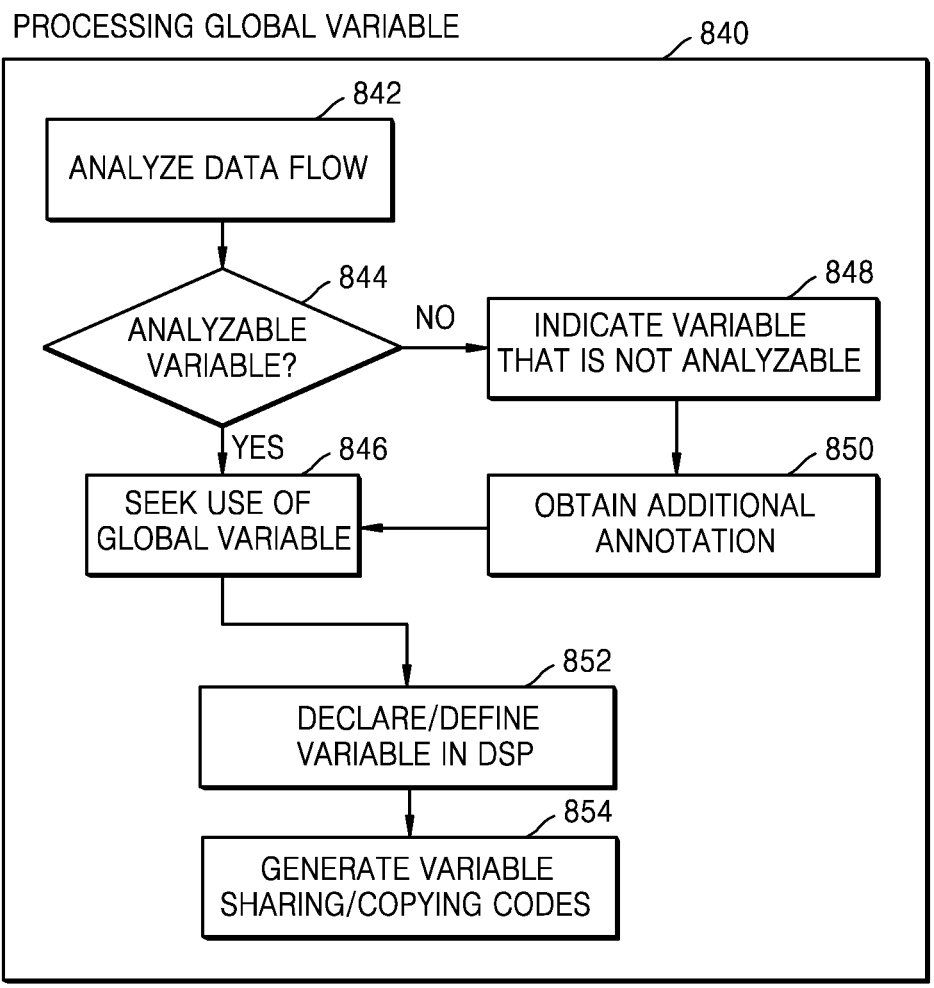
FIG. 10 is a flowchart for explaining the processing of a global variable according to an exemplary embodiment.

FIG. 10 is a flowchart for explaining the processing of a global variable according to an exemplary embodiment.

Processing of a Global Variable (840)

In Operation 842, data flow analysis is performed.

In Operation 844, it is determined whether a parameter is analyzable in the data flow analysis. Processing a case in which an unanalyzable variable exists is described later.

In Operation 846, in an RPC performing procedure, a variable outside the procedure, that is, a part using a global variable, is sought through the data flow analysis in the operation 842.

In Operation 852, a corresponding variable is declared and defined in a DSP code.

In Operation 854, variable sharing and copying codes are inserted in the CPU and DSP codes.

For example, FIG. 11 illustrates an exemplary embodiment of the processing of a global variable. In FIG. 11, a code related to the processing of a global variable is indicated in bold. The RPC performing procedure is written in a DSP code "interface_server.c", and it may be seen that "global" is used as a variable outside the procedure. Accordingly, "global" is declared and defined in the DSP code, and a variable "global" is shared with a CPU code "main.c" and a DSP code "interface_serve.c" and a copy code is inserted in a CPU code "main.c" and a DSP code "interface_serve.c".

In Operation 844 of FIG. 10, it is determine whether an unanalyzable variable in the data flow analysis exists. For example, like "void *d", there may be a case in which a commonly usable pointer is declared for use instead of assigning a type with respect to a variable d. When such a pointer is used, a programmer who directly writes a code may appropriately convert the pointer to an "int" type or a "float" type as necessary according to the determination of the programmer. Alternatively, the pointer may be used by appropriately being converted to an "int" type or a "float" type according to the type of a data value used in the execution of a program. However, as in some exemplary embodiments, when the compiler automatically generates a code, the compiler may not determine how to handle the pointer having no assigned type like "void *d". When the unanalyzable variable is generated, the compiler indicates the unanalyzable variable (Operation 848), and for example, the "int" type, is assigned to the unanalyzable variable, or the unanalyzable variable is processed according to a conditional expression such as "if", "else", etc. so that annotation is additionally obtained (Operation 850) and processed by the compiler.

Figure 12:
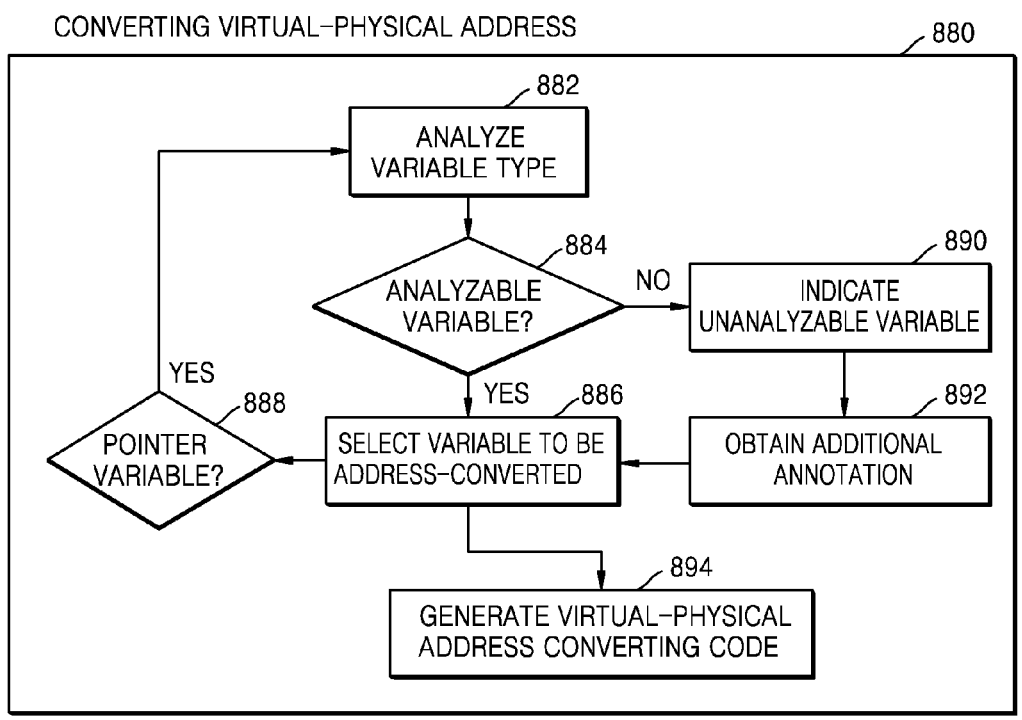
FIG. 12 is a flowchart for explaining the converting of a virtual-physical address according to an exemplary embodiment.

FIG. 12 is a flowchart for explaining the converting of a virtual-physical address according to an exemplary embodiment.

Converting of a Virtual-Physical Address (880)

In Operation 860 of FIG. 8, it is determined whether the MMU exists.

When the MMU exists, the converting of a virtual-physical address is performed in the operation 880.

In Operation 882 of FIG. 12, a data type of a variable of an RPC procedure is analyzed.

In Operation 884, it is determined whether the variable is analyzable. Processing a case in which an unanalyzable variable exists is described later.

In Operation 886, a variable to be address-converted is selected according to a result of the variable type analysis of the operation 882.

In Operation 888, for a pointer, a variable that is a target of a pointer is selected as an analysis target by determining the data type of the selected variable to be address-converted.

In Operation 894, a virtual-physical address converting code is inserted in the finally determined variables to be address-converted before and after the RPC call.

Figure 13:
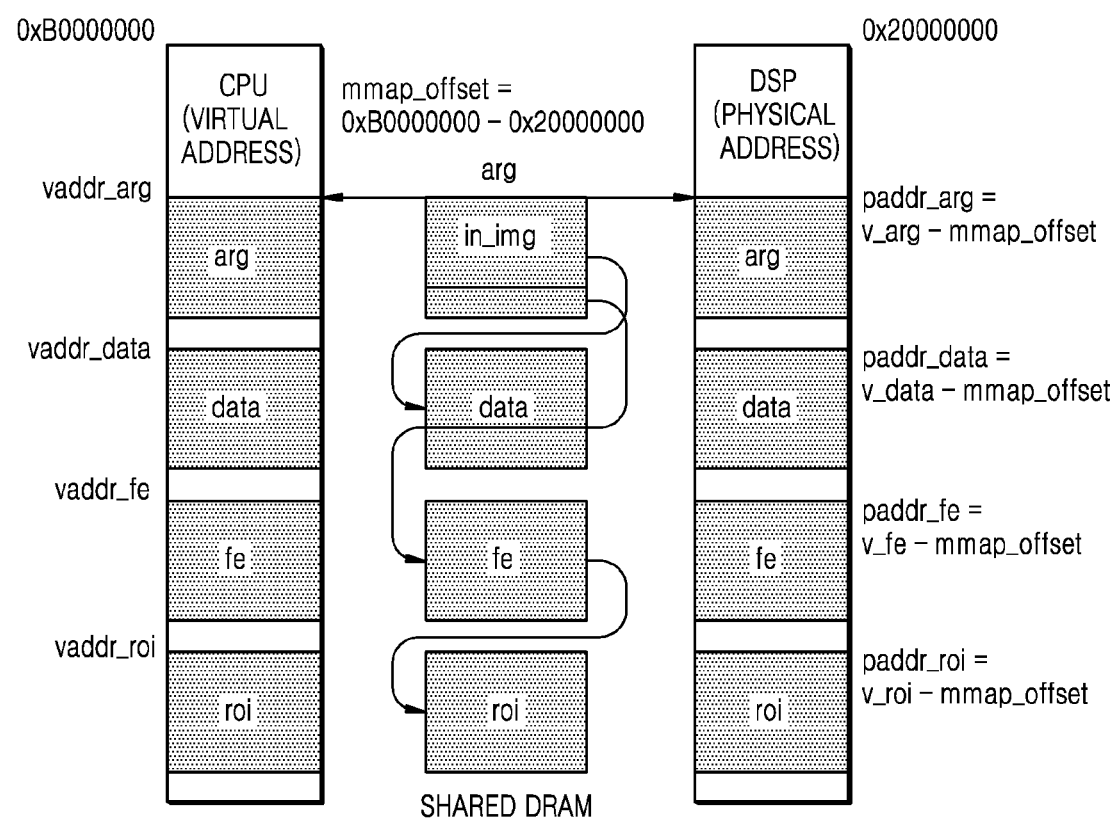
FIG. 13 illustrates an exemplary embodiment of the converting of a virtual-physical address.

For example, FIG. 13 illustrates an exemplary embodiment of the converting of a virtual-physical address. The CPU and the DSP may use DRAM of the DSP as a shared memory. In this state, the CPU may use "0xB0000000" that is "vaddr_arg" as a virtual address of memory with respect to a variable "arg". The DSP may use "0x20000000" that is "paddr_arg" as a physical address of the memory with respect to the variable "arg". In this case, when performing the RPC, the CPU and the DSP need converting of a virtual-physical address with respect to the variable "arg". In an example of the variable "arg", when a physical address of the variable "arg" is converted from a virtual address, the physical address may be converted as "paddr_arg=vaddr_arg-mmap_offset" by using an offset "mmap_offset=0xB0000000-0x20000000". In FIG. 13, arrows in the shared DRAM indicate pointers.

Even in the process of analyzing a data type of a variable of an RPC procedure, as described in relation with the data flow analysis in FIG. 10, an unanalyzable variable may be generated as a result of determining whether the variable is analyzable in the operation 884. In the processing of an unanalyzable variable, as described with reference to FIG. 10, the compiler indicates an unanalyzable variable (Operation 890) and additional annotation is obtained with respect to the unanalyzable variable (Operation 892) and processed by the compiler.

Figure 14:
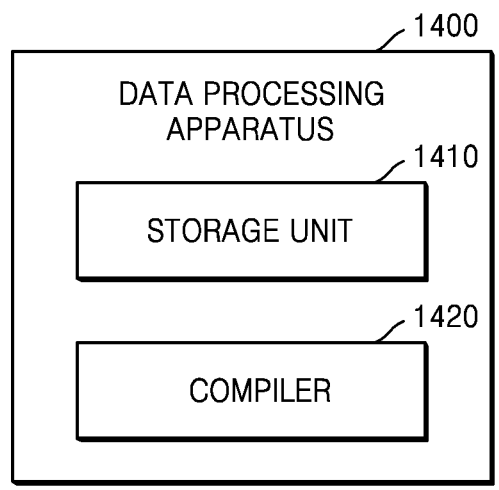
FIG. 14 is a block diagram schematically illustrating a data processing apparatus according to an exemplary embodiment.

FIG. 14 is a block diagram schematically illustrating a data processing apparatus 1400 according to an exemplary embodiment.

Referring to FIG. 14, the data processing apparatus 1400 may include a storage unit 1410 and a compiler 1420. Although omitted in FIG. 14, the data processing apparatus 1400 may further include peripheral devices, for example, an input unit such as a keyboard, a mouse, or a touch panel, an output unit such as a display, a communication unit such as network communication, a printer, a scanner, etc. Also, a compiler 1420 may be implemented in form of a program executed by a processor such as a CPU. The data processing apparatus 1400 may be, for example, an apparatus capable of compiling a source code, such as, a computer, a server, a client, a mobile device, etc.

The storage unit 1410 may store a source code including information indicating a part where an RPC is to be performed. The storage unit 1410 may store an operating system for operating the data processing apparatus 1400, an application program for executing an application function, data generated and used during the execution of a program, etc.

The compiler 1420 generates a code for calling an RPC and a code for executing an RPC procedure, by analyzing a source code including information indicating a part where an RPC is to be performed. The information indicating a part where an RPC is to be performed may be annotation. The compiler 1420 may generate an interface description needed for generating an RPC stub code. The code for calling an RPC may be a main processor source code, and the code for executing an RPC procedure may be a sub-processor source code.

The compiler 1420 may generate a procedure code executed in a sub-processor, generate a code for assigning shared data between the main processor and the sub-processor to a shared memory, and generate a procedure parameter transferring code for an RPC.

The compiler 1420 may seek a part using a global variable outside the procedure from the procedure where an RPC is performed, through data flow analysis, declare and define a global variable outside the procedure that is sought in the sub-processor source code, and insert a global variable sharing and copying code in the main processor source code and the sub-processor source code.

The data processing apparatus 1400 may further include the MMU. When there is the MMU, the compiler 1420 may analyze a data type of a variable of the procedure performing an RPC, select a variable to be address-converted according to a result of the analyzing of a data type of a variable, and insert a virtual-physical address converting code to convert a virtual address and a physical address in the selected variables to be address-converted, before and after the RPC call.

Figure 15:
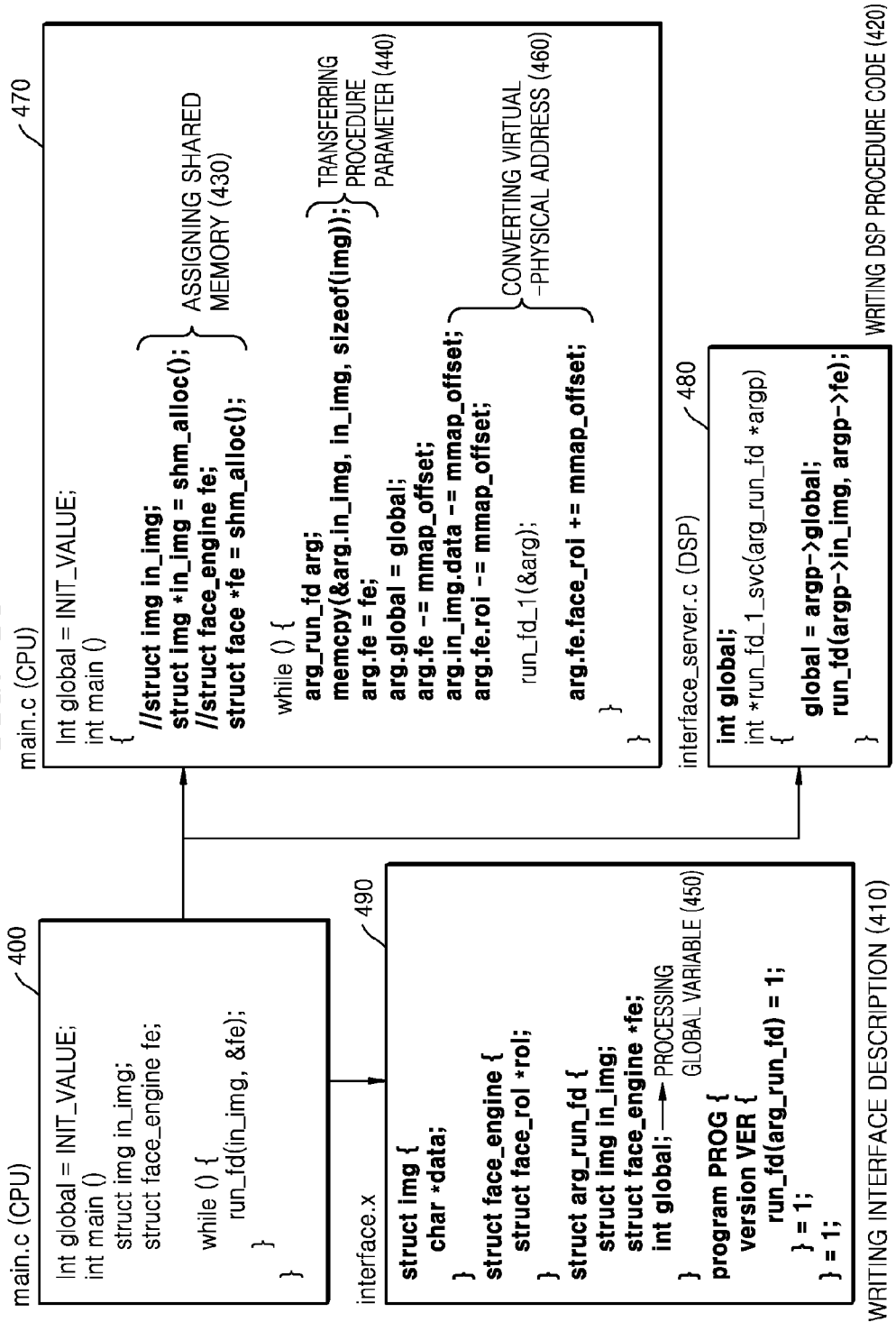
FIG. 15 schematically illustrates a code for implementing face detection by using the procedure call type RPC of FIG. 4, according to an exemplary embodiment.

FIG. 15 schematically illustrates a code for implementing face detection by using the procedure call type RPC of FIG. 4, according to an exemplary embodiment.

The application source code 400 of FIG. 4 may correspond to a CPU code "main.c" at the left of FIG. 15. The programmer may directly write a code indicated in bold in FIG. 15 for the writing of an interface description 410, the writing of a DSP procedure code 420, the assigning of a shared memory 430, the transferring of a procedure parameter 440, the processing of a global variable 450, the converting of a virtual-physical address 460 of FIG. 4. "main.c" at the right of FIG. 15 that is the CPU source code 470 of FIG. 4, "interface_server.c" of FIG. 15 that is the DSP source code 480 of FIG. 4, and "interface.x" of FIG. 15 that is the interface description 490 of FIG. 4 are directly written by the programmer.

FIG. 16 schematically illustrates a code for implementing face detection by using the code annotation type RPC of FIG. 6, according to an exemplary embodiment.

The application source code 600 of FIG. 6 may correspond to "main.c" at the left in the code of FIG. 16. The programmer writes only a code "#pragma rpc" indicated in bold in FIG. 6 as the code annotation 610 of FIG. 6. "main.c" at the right of FIG. 16 that is the CPU source code 670 of FIG. 6, "interface_server.c" of FIG. 16 that is the DSP source code 680 of FIG. 6, and "interface.x" that is the interface description 690 of FIG. 6 are automatically generated by the compiler analysis 620 of FIG. 6 according to an exemplary embodiment.

According to some exemplary embodiments using a code annotation type RPC, since the number of operations that are performed by the programmer is greatly reduced, convenience in using the RPC by the programmer may be improved. Also, since the number of codes to be written by the programmer is reduced, development time may be shortened and possibility of being an error may be excluded.

Although in some exemplary embodiments, for example, the CPU is used as the main processor and the DSP is used as the sub-processor, the present inventive concept is not limited to this exemplary embodiment.

For example, when a multicore DSP is used, a function to automatically select a core that becomes a target of an offload may be added. For example, when a sound processing DSP and an image processing DSP are used altogether, the sound processing DSP may be selected to be used for performing an RPC with respect to a sound recognition function, and an image processing DSP may be selected to be used for performing an RPC with respect to a face detection function.

Also, for example, when a multicore CPU is used, an offloading function to another CPU core may be added with a sub-processor. The relationship between a main processor and a sub-processor may be not only a relationship between a CPU and a DSP, but also a relationship between a CPU and another CPU, or a DSP and another DSP, etc., and may be applied to a case in which distributed processing is available, for example, a relationship between a client and a server, a relationship between a computer and another computer, a relationship between a mobile device and a server, a relationship between a wearable device and a smartphone, etc.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of generating a code for a remote procedure call (RPC), the method comprising:
   obtaining a source code including information indicating a part where the RPC is to be performed; and
   generating a code for initiating the RPC, a code for executing an RPC procedure, and an interface description needed for an RPC stub code, by analyzing the source code including information indicating the part where the RPC is to be performed,
   wherein the generating comprises processing the RPC, processing a global variable, and if it is determined that a memory management unit (MMU) exists, converting a virtual-physical address to perform conversion between a virtual address and a physical address,
   wherein a code for calling the RPC is a main processor source code, and the code for executing the RPC procedure is a sub-processor source code,
   wherein the processing of the RPC comprises:
      generating a procedure code performed by the sub-processor,
      generating a code for assigning shared data between the main processor and the sub-processor to a shared memory, and
      generating a procedure parameter transferring code for the RPC,
   wherein the processing of the global variable comprises:
      performing a data flow analysis to seek, from a procedure for performing the RPC, a global variable outside the procedure,
      declaring and defining the global variable outside the procedure in the sub-processor source code, and
      inserting a sharing and copying code with respect to the global variable in the main processor source code and the sub-processor source code.

2. The method of claim 1, wherein the information indicating the part where the RPC is to be performed is an annotation.

3. The method of claim 1, wherein the generating further comprises:
   determining if the MMU exists; and
   if it is determined that the MMU exists, converting the virtual-physical address to perform conversion between the virtual address and the physical address, and
   the converting of the virtual-physical address comprises:
      analyzing a data type of a variable of a procedure for performing the RPC;
      selecting a variable to be address-converted, according to a result of the analyzing of the data type of the variable; and
      inserting a virtual-physical address converting code in the selected variable to be address-converted, before and after the RPC call.

4. A data processing apparatus comprising:
   a storage unit configured to store a source code including information indicating a part where a remote procedure call (RPC) is to be performed; and
   a compiler configured to generate a code for initiating the RPC, a code for executing the RPC procedure, and an interface description needed for generating an RPC stub code, by analyzing the source code including information indicating the part where the RPC is to be performed,
   wherein the compiler is implemented in a processor,
   wherein the compiler is further configured to process the RPC, process a global variable, and if it is determined that a memory management unit (MMU) exists, convert a virtual-physical address to perform conversion between a virtual address and a physical address,
   wherein the code for calling the RPC is a main processor source code, and the code for executing the RPC procedure is a sub-processor source code, and
   wherein the compiler is further configured to:
      generate a procedure code performed by the sub-processor, generate a code for assigning shared data between the main processor and the sub-processor to a shared memory,
generate a procedure parameter transferring code for the RPC,
seek, from a procedure for performing the RPC, a global variable outside the procedure, through a data flow analysis,
declare and define the global variable outside the procedure in the sub-processor source code, and
insert a sharing and copying code with respect to the global variable in the main processor source code and the sub-processor source code.

5. The data processing apparatus of claim 4, wherein the information indicating the part where the RPC is to be performed is an annotation.

6. The data processing apparatus of claim 4, further comprising the MMU,
wherein the compiler is further configured to analyze a data type of a variable of a procedure for performing the RPC,
select a variable to be address-converted, according to a result of the analyzing of the data type of the variable, and
insert a virtual-physical address converting code in the selected variable to be address-converted, before and after the RPC call.

7. At least one non-transitory computer-readable recording medium for storing a computer program configured to be readable by at least one processor for instructing the at least one processor to execute a computer process for performing a method comprising:
obtaining a source code including information indicating a part where the RPC is to be performed; and
generating a code for calling the RPC, a code for executing an RPC procedure, and an interface description needed for an RPC stub code, by analyzing the source code including information indicating the part where the RPC is to be performed,
wherein the generating comprises processing the RPC, processing a global variable, and if it is determined that a memory management unit (MMU) exists, converting a virtual-physical address to perform conversion between a virtual address and a physical address,
wherein a code for calling the RPC is a main processor source code, and the code for executing the RPC procedure is a sub-processor source code,
wherein the processing of the RPC comprises:
generating a procedure code performed by the sub-processor,
generating a code for assigning shared data between the main processor and the sub-processor to a shared memory, and
generating a procedure parameter transferring code for the RPC,
wherein the processing of the global variable comprises:
performing a data flow analysis to seek, from a procedure for performing the RPC, a global variable outside the procedure,
declaring and defining the global variable outside the procedure in the sub-processor source code, and
inserting a sharing and copying code with respect to the global variable in the main processor source code and the sub-processor source code.

8. At least one non-transitory computer-readable recording medium for storing a computer program configured to be readable by at least one processor for instructing the at least one processor to execute a computer process for performing a method comprising:
obtaining a source code including information indicating a part where the RPC is to be performed; and
generating a code for calling the RPC, a code for executing an RPC procedure, and an interface description needed for an RPC stub code, by analyzing the source code including information indicating the part where the RPC is to be performed,
wherein the generating comprises processing the RPC, processing a global variable, and if it is determined that a memory management unit (MMU) exists, converting a virtual-physical address to perform conversion between a virtual address and a physical address,
wherein the information indicating the part where the RPC is to be performed is an annotation,
wherein a code for calling the RPC is a main processor source code, and the code for executing the RPC procedure is a sub-processor source code,
wherein the processing of the RPC comprises:
generating a procedure code performed by the sub-processor,
generating a code for assigning shared data between the main processor and the sub-processor to a shared memory, and
generating a procedure parameter transferring code for the RPC,
wherein the processing of the global variable comprises:
performing a data flow analysis to seek, from a procedure for performing the RPC, a global variable outside the procedure,
declaring and defining the global variable outside the procedure in the sub-processor source code, and
inserting a sharing and copying code with respect to the global variable in the main processor source code and the sub-processor source code.

9. At least one non-transitory computer-readable recording medium for storing a computer program configured to be readable by at least one processor for instructing the at least one processor to execute a computer process for performing a method comprising:
obtaining a source code including information indicating a part where the RPC is to be performed; and
generating a code for calling the RPC, a code for executing an RPC procedure, and an interface description needed for an RPC stub code, by analyzing the source code including information indicating the part where the RPC is to be performed,
wherein the generating comprises processing the RPC, processing a global variable, and if it is determined that a memory management unit (MMU) exists, converting a virtual-physical address to perform conversion between a virtual address and a physical address, and
wherein the generating further comprises:
determining if the MMU exists, and
if it is determined that the MMU exists, converting the virtual-physical address to perform conversion between the virtual address and the physical address, and
the converting of the virtual-physical address comprises:
analyzing a data type of a variable of a procedure for performing the RPC,
selecting a variable to be address-converted, according to a result of the analyzing of the data type of the variable, and inserting a virtual-physical address converting code in the selected variable to be address-converted, before and after the RPC call, wherein a code for calling the RPC is a main processor source code, and the code for executing the RPC procedure is a sub-processor source code, wherein the processing of the RPC comprises:
  generating a procedure code performed by the sub-processor,
  generating a code for assigning shared data between the main processor and the sub-processor to a shared memory, and
  generating a procedure parameter transferring code for the RPC, wherein the processing of the global variable comprises:
  performing a data flow analysis to seek, from a procedure for performing the RPC, a global variable outside the procedure,
  declaring and defining the global variable outside the procedure in the sub-processor source code, and
  inserting a sharing and copying code with respect to the global variable in the main processor source code and the sub-processor source code.

* * * * *